United States Patent
Choi et al.

(10) Patent No.: US 9,348,749 B2
(45) Date of Patent: May 24, 2016

(54) HOST-DRIVEN GARBAGE COLLECTION

(71) Applicant: SAMSUNG SEMICONDUCTOR CO., LTD., Suwon-si, Gyeonggi-do (KR)

(72) Inventors: Sang Hoon Choi, Seoul (KR); Hyung Jin Im, Hwaseong-si (KR); Jeong Uk Kang, Bucheon-si (KR); Moon Sang Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 8 days.

(21) Appl. No.: 14/212,297

(22) Filed: Mar. 14, 2014

(65) Prior Publication Data

US 2014/0281338 A1 Sep. 18, 2014

(30) Foreign Application Priority Data

Mar. 15, 2013 (KR) ........................ 10-2013-0028312

(51) Int. Cl.
*G06F 12/02* (2006.01)
*G06F 3/06* (2006.01)

(52) U.S. Cl.
CPC .............. *G06F 12/0269* (2013.01); *G06F 3/06* (2013.01); *G06F 12/0246* (2013.01); *G06F 2212/7205* (2013.01)

(58) Field of Classification Search
CPC ... G06F 12/0246; G06F 12/0269; G06F 3/06; G06F 2212/7205
See application file for complete search history.

(56) References Cited

U.S. PATENT DOCUMENTS

| | | | |
|---|---|---|---|
| 6,065,020 A | 5/2000 | Dussud | |
| 6,611,858 B1 * | 8/2003 | Aravamudan et al. | 709/203 |
| 7,340,494 B1 * | 3/2008 | Detlefs et al. | |
| 7,890,550 B2 | 2/2011 | Jung et al. | |
| 7,925,846 B2 | 4/2011 | Ebata | |
| 8,032,724 B1 * | 10/2011 | Smith | 711/159 |
| 8,166,269 B2 | 4/2012 | Vengerov | |
| 2010/0287217 A1 * | 11/2010 | Borchers et al. | 707/813 |
| 2011/0107050 A1 * | 5/2011 | Vengerov | 711/170 |
| 2012/0005406 A1 * | 1/2012 | Hutchison et al. | 711/103 |
| 2012/0323979 A1 | 12/2012 | Basu et al. | |
| 2014/0164674 A1 * | 6/2014 | Verhaeghe et al. | 711/102 |

FOREIGN PATENT DOCUMENTS

| | | |
|---|---|---|
| KR | 2005-0017869 A | 9/2006 |
| KR | 2009-0097671 A | 9/2009 |
| KR | 1026634 B1 | 4/2011 |
| KR | 2012-0049604 A | 5/2012 |

OTHER PUBLICATIONS

Science Direct(2007), "A multi-channel architecture for high-performance for NAND Flash Memory-Based Storage System".
Sungjin Lee, et al., "Buffer-Aware Garbage Collection for NAND Flash Memory-Based Storage System".
Junghee Leedh, et al., "A semi-Preemptive Garbage Collector for Solid State Drives".

(Continued)

*Primary Examiner* — Eric Oberly
(74) *Attorney, Agent, or Firm* — Volentine & Whitt, PLLC

(57) ABSTRACT

A host receives information related to garbage collection of a storage device, and it controls selective execution of garbage collection by the storage device according to the received information.

24 Claims, 16 Drawing Sheets

(56) References Cited

OTHER PUBLICATIONS

Yu Cai, et al, "Flash Correct-and-Refresh: Retention Aware Error Management for Increased Flash Memory Lifetime".

Keonsoo Ha, Jihong Kim, "A Program Contaxt-Aware Data Separation Technique for Reducing Garbage Collection Overhead in NAND Flash Memory".

Evegeny Budilovsky, et al., "Prototyping a High-Performance Low-Cost Solid-State Disk".

* cited by examiner

HOST-DRIVEN GARBAGE COLLECTION

CROSS-REFERENCE TO RELATED APPLICATIONS

This application claims priority under 35 U.S.C. §119 to Korean Patent Application No. 10-2013-0028312 filed on Mar. 15, 2013, the subject matter of which is hereby incorporated by reference in its entirety.

BACKGROUND OF THE INVENTION

Embodiments of the inventive concept relate generally to information storage technologies. More particularly, certain embodiments of the inventive concept relate to systems and methods in which a host controls selective execution of garbage collection by a storage device.

Nonvolatile memory devices, such as flash memory devices, are widely used in a variety of applications such as universal serial bus (USB) drives, digital cameras, mobile phones, smart phones, tablet personal computers (PCs), memory cards, and solid state drives (SSDs), to name but a few.

A flash memory device is typically organized into a plurality of memory blocks, pages, and memory cells, where each of the memory blocks comprises a plurality of pages, and each of the pages comprises a plurality of memory cells. In general, each of the memory cells may be a single-level cell (SLC) or a multi-level cell (MLC). An SLC is a memory cell that stores one bit of information, and an MLC is a memory cell that stores multiple bits of information.

In a typical flash memory device, program operations are performed in units of pages, and erase operations are performed in units of memory blocks. Where a flash memory device receives a program command to replace a page of current data with new data, the flash memory device typically stores the new data in a page having an erased state, and it invalidates the current data. In other words, the flash memory device does not overwrite the current data at its current page location, but merely invalidates the current data and stores the new data in another page.

As the flash memory device continues to operate, invalid pages tend to accumulate in memory blocks that have not been recently erased. The accumulation of invalid pages generally reduces the amount of usable storage space in the flash memory device, and it can also slow down operation of the flash memory device. Accordingly, so-called garbage collection operations may be performed on memory blocks containing significant numbers of invalid pages to reclaim some of the storage space. A typical garbage collection operation involves moving any remaining valid data from a target memory block to a different memory block and then erasing the target memory block. Garbage collection operations are typically performed automatically as part of memory management.

SUMMARY OF THE INVENTION

In one embodiment of the inventive concept, a method comprises receiving, by a host, information related to garbage collection of a storage device, and controlling, by the host, selective execution of garbage collection by the storage device according to the received information.

In another embodiment of the inventive concept, a method comprises transmitting, by a storage device to a host, information related to garbage collection of the storage device, receiving, by the storage device from the host, an instruction generated in response to the information related to garbage collection, and selectively executing garbage collection, by the storage device, according to the received instruction.

In yet another embodiment of the inventive concept, a method comprises transmitting, by a storage device to a host, information related to garbage collection of the storage device, transmitting, by the host to the storage device, an instruction generated in response to the information related to garbage collection, and selectively executing garbage collection, by the storage device, according to the instruction.

In yet another embodiment of the inventive concept, a host device comprises an interface configured to receive information related to garbage collection of a storage device, and a processor configured to analyze the received information and to communicate with the storage device through the interface to control selective execution of garbage collection by the storage device according to the analyzed information.

In yet another embodiment of the inventive concept, a storage device comprises a garbage collection control module configured to transmit, to a host, information related to garbage collection of the storage device, receive, from the host, an instruction generated in response to the information related to garbage collection, and selectively execute garbage collection according to the received instruction.

In yet another embodiment of the inventive concept, a system comprises a storage device comprising a memory cell array and a garbage collection control module configured to selectively execute garbage collection on the memory cell array, and a host device configured to control the selective execution of garbage collection by the garbage collection control module in response to information received from the storage device.

These and other embodiments of the inventive concept can potentially improve the performance of a memory system by allowing a host to dynamically adjust input/output (I/O) latency of a storage device. The host may dynamically adjust the I/O latency by controlling selective execution of garbage collection by the storage device based on information received from the storage device.

BRIEF DESCRIPTION OF THE DRAWINGS

The drawings illustrate selected embodiments of the inventive concept. In the drawings, like reference numbers indicate like features.

DETAILED DESCRIPTION

Figure 1:
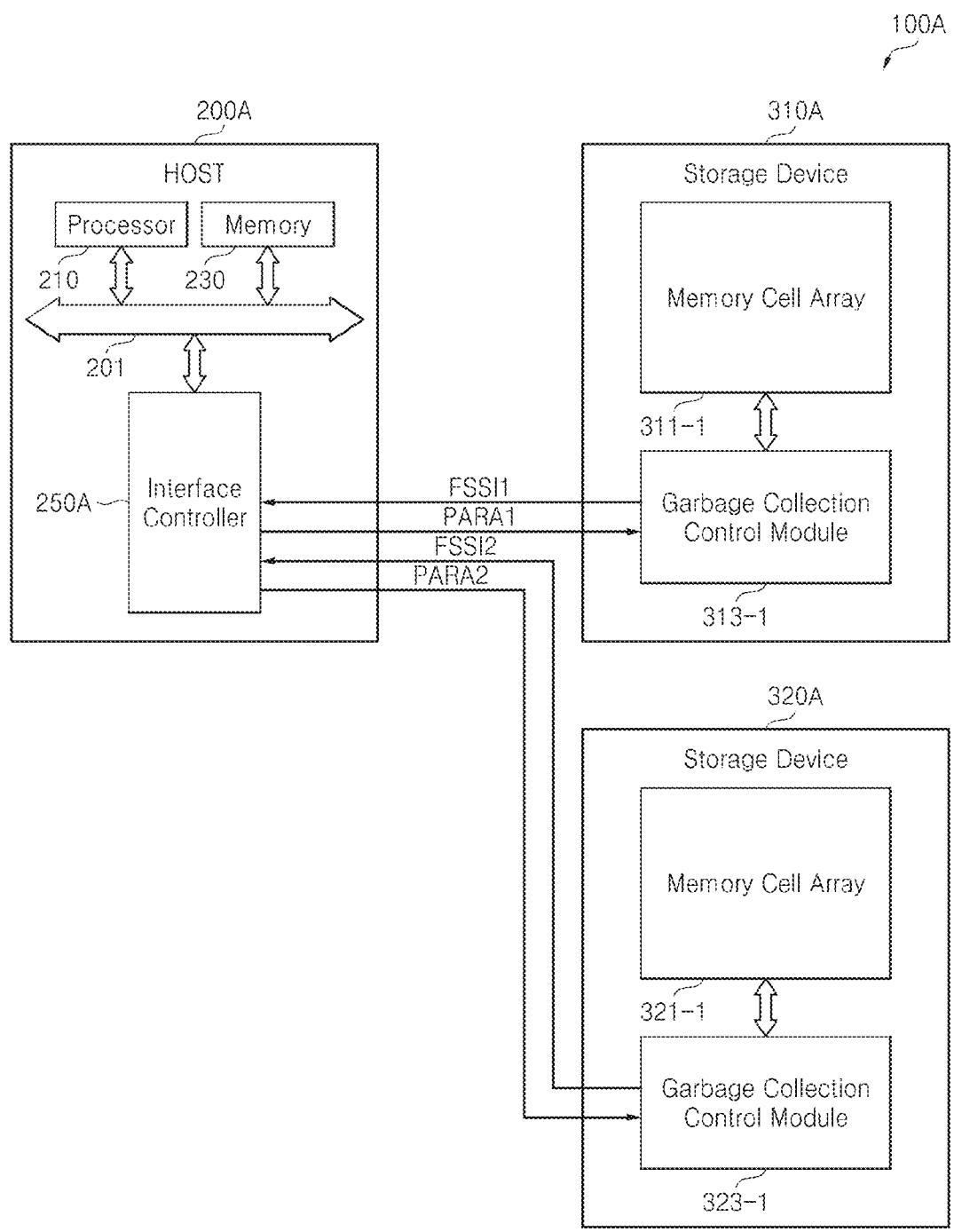
FIG. 1 is a block diagram of a system according to an embodiment of the inventive concept.

Selected embodiments of the inventive concept are described below with reference to the accompanying drawings. These embodiments are presented as teaching examples and should not be construed to limit the scope of the inventive concept.

In the description that follows, where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. As used herein, the term "and/or" includes any and all combinations of one or more of the associated listed items and may be abbreviated as "/".

The terms first, second, etc. may be used herein to describe various features, but the described features should not be limited by these terms. Rather, these terms are used merely to distinguish one feature from another. For example, a first signal could be termed a second signal, and vice versa, without changing the meaning of the relevant teachings.

The terminology used herein is for the purpose of describing particular embodiments only and is not intended to be limiting of the inventive concept. As used herein, the singular forms "a", "an" and "the" are intended to encompass the plural forms as well, unless the context clearly indicates otherwise. Terms such as "comprises" and/or "comprising," or "includes" and/or "including", where used herein, indicate the presence of stated features but do not preclude the presence or addition of one or more other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this application, and should not be interpreted in an idealized or overly formal sense unless expressly so defined herein.

The described embodiments relate generally to host-based control of garbage collection operations performed by one or more storage devices. In certain embodiments, for instance, a host receives information related to garbage collection, and it controls selective execution of garbage collection by the storage device based on the received information. The term "selective execution" here refers to the execution or non-execution of garbage collection based on the information.

The information related to garbage collection, also referred to as garbage collection information, typically comprises at least one of an amount of programmable free space in the storage device, a garbage collection state of the storage device, a garbage collection threshold of the storage device, and an allotted time for garbage collection of the storage device. The garbage collection threshold may be, for instance, a level of programmable free space at which garbage collection is to be performed or not performed. The garbage collection state may be, for instance, an indication of whether garbage collection is needed or whether garbage collection is being performed.

The controlling of selective execution of garbage collection can be performed in various ways. For instance, in some embodiments it comprises transmitting, to the storage device, a garbage collection command and at least one parameter value determining an amount of garbage collection to be performed by the storage device in response to the garbage collection command, wherein the at least one parameter value indicates at least one of an execution period for garbage collection, a quantity of memory to be freed by garbage collection, and an overall level of programmable free space to be achieved in the storage device by garbage collection. In certain other embodiments, it comprises transmitting, to the storage device, a threshold value indicating a modified level of programmable free space below which the storage device is to initiate incremental garbage collection, or alternatively, transmitting, to the storage device, a threshold value indicating a level of programmable free space above which the storage device is to avoid garbage collection. In certain other embodiments, it comprises analyzing, by the host, information regarding data to be stored in the storage device, the information comprising at least one of a pattern, an amount, and a starting address of the data to be stored in the storage device, and controlling an amount of garbage collection to be performed by the storage device according to the analyzed information. In certain other embodiments, it comprises analyzing, by the host, information regarding a process performed by the host, and adjusting an amount of garbage collection to be performed by the storage device according to the analyzed information.

The host-driven control of garbage collection can provide various potential performance benefits for the host and/or storage device. For example, it may cause garbage collection to be performed earlier than it would otherwise be performed if not controlled by the host. Among other things, this can potentially reduce subsequent delays in memory access operations, providing faster response time and greater throughput, and it may improve wear levelling, leading to longer device lifetime.

FIG. 1 is a block diagram of a system 100A according to an embodiment of the inventive concept.

Referring to FIG. 1, system 100A comprises a host 200A and at least one memory device, represented by a first memory device 310A and a second memory device 320A.

System 100A may take various alternative forms. As examples, it may take the form of a personal computer (PC), a data server, a network-attached storage (NAS), or a portable electronic device. The portable electronic device may be, for instance, a laptop computer, a mobile telephone, a smart phone, a tablet PC, a personal digital assistant (PDA), an enterprise digital assistant (EDA), a digital still camera, a digital video camera, a portable multimedia player (PMP), a portable navigation device (PND), a handheld game console, a mobile internet device (MID), or an e-book.

Host 200A receives first programmable free space size information FSSI1 from first memory device 310A, generates a first parameter PARA1 based on the received first programmable free space size information FSSI1, and transmits first parameter PARA1 to first memory device 310A. First parameter PARA1 is used to control selective execution of first garbage collection of first memory device 310A.

First memory device 310A performs garbage collection based on first parameter PARA1. For example, first memory device 310A may adjust a first programmable free space size of first memory device 310A or an execution period of time during which the garbage collection is performed in first memory device 310A, based on first parameter PARA1.

Host 200A receives second programmable free space size information FSSI2 from second memory device 320A, generates a second parameter PARA2 based on the received second programmable free space size information FSSI2, and transmits second parameter PARA2 to second memory device 320A. Second parameter PARA2 is used to control selective execution of second garbage collection of second memory device 320A.

Second memory device 320A performs garbage collection based on second parameter PARA2. First parameter PARA1 and second parameter PARA2 may be the same or different. For example, second memory device 320A may adjust a second programmable free space size of second memory device 320A or an execution period of time during which the garbage collection is performed in the second memory-based second storage device 320A, based on second parameter PARA2.

Each of memory devices 310A and 320A may take any of several forms, such as a flash-based memory device in the form of an embedded multimedia card (eMMC), a universal flash storage (UFS), a solid state drive (SSD), or a redundant array of independent disks (RAID). Each of memory devices 310A and 320A may also take a form other than a flash-based memory device. For example, the nonvolatile memory device be another form of electrically erasable programmable read-only memory (EEPROM), a magnetic random access memory (MRAM), a spin-transfer torque MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory.

Host 200A comprises a processor 210, a memory 230, and an interface controller 250A. Processor 210 controls operations of memory 230 and interface controller 250A via a bus 201. In some embodiments, host 200A comprises an application processor or a mobile application processor. Processor 210 typically executes a program capable of performing an operation or a function associated with host-driven garbage collection, for example, an operating system (OS), a device driver, or an application program.

Memory 230 is a working memory capable of storing a program associated with the host-driven garbage collection, and may be implemented by using a volatile memory or a nonvolatile memory.

Interface controller 250A comprises hardware and/or software capable of interfacing a signal (or data) that is exchanged between host 200A and first memory device 310A and second memory device 320A. For example, interface controller 250A may be a controller that is suitable for a Serial Advanced Technology Attachment (SATA) interface (or protocol), a serial attached SCSI (SAS) interface (or protocol) or a peripheral component interconnect express (PCIe) interface (or protocol).

First memory device 310A comprises a memory cell array 311-1 and a garbage collection control module 313-1.

Figure 3:
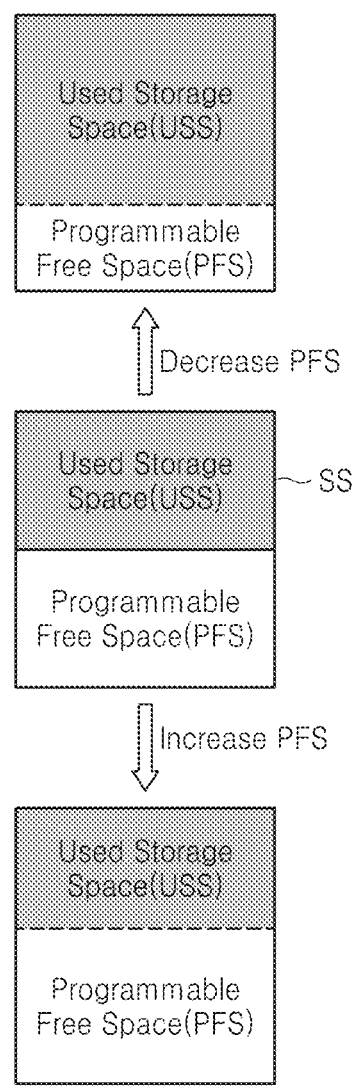
FIG. 3 is a conceptual diagram of a memory map corresponding to a memory cell array illustrated in FIG. 1, according to an embodiment of the inventive concept.
Figure 4:
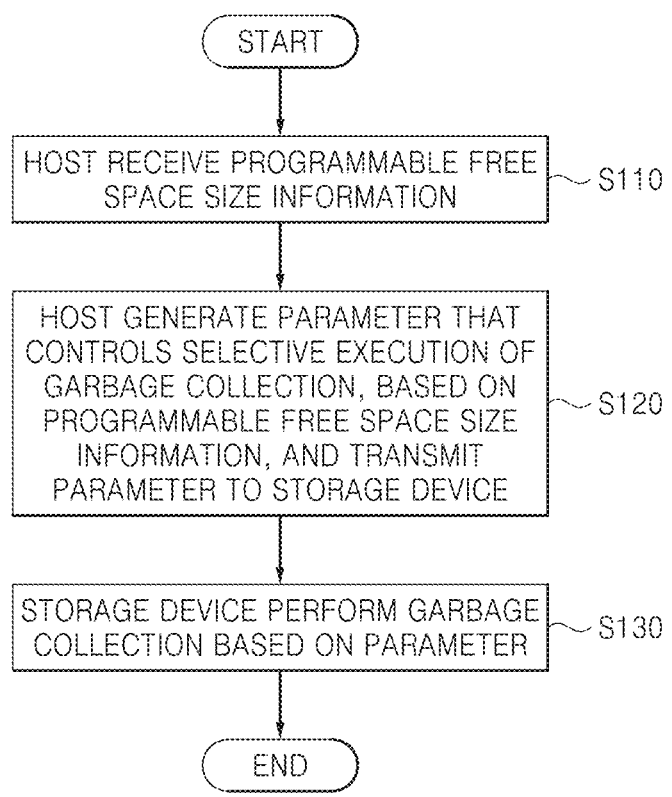
FIG. 4 is a flowchart illustrating operations of the system illustrated in FIG. 1 or 2, according to an embodiment of the inventive concept.
Figure 5:
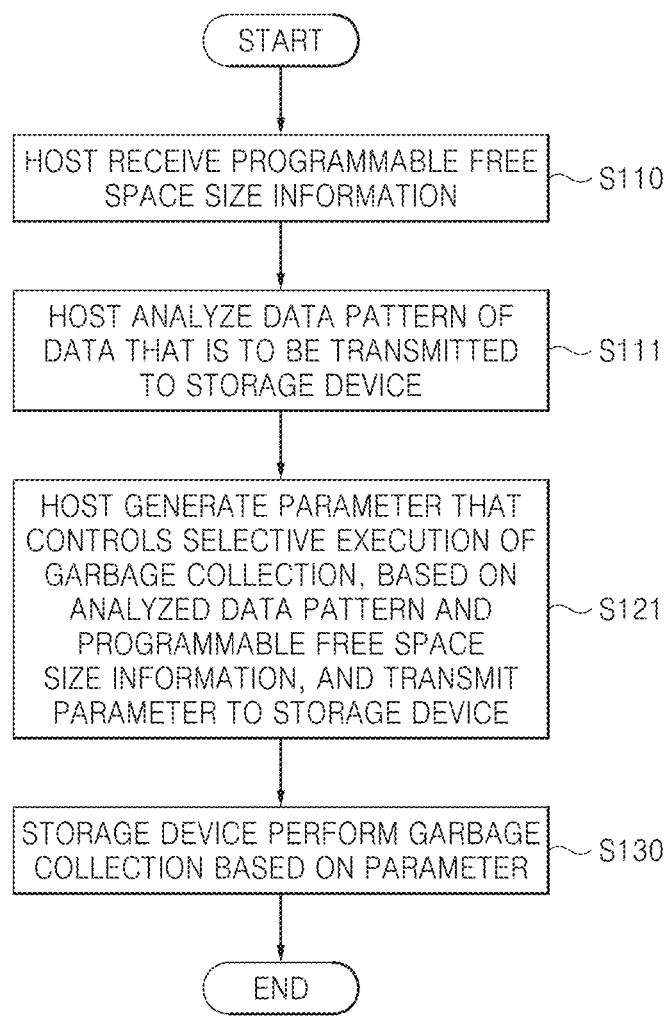
FIG. 5 is a flowchart illustrating operations of the system illustrated in FIG. 1 or 2, according to an embodiment of the inventive concept.
Figure 6:
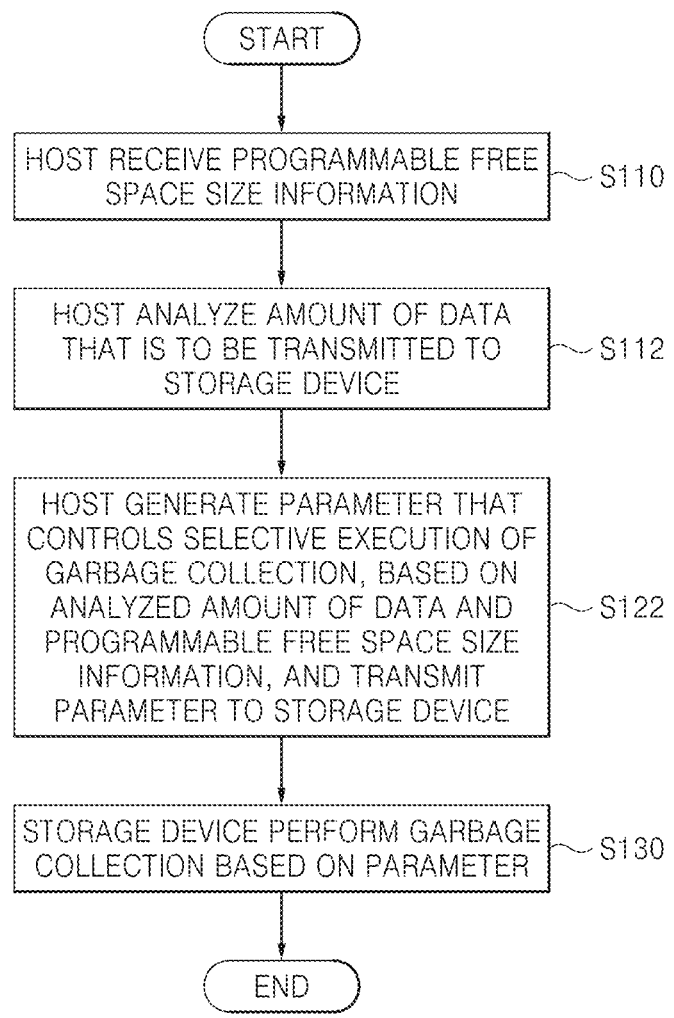
FIG. 6 is a flowchart illustrating operations of the system illustrated in FIG. 1 or 2, according to an embodiment of the inventive concept.
Figure 7:
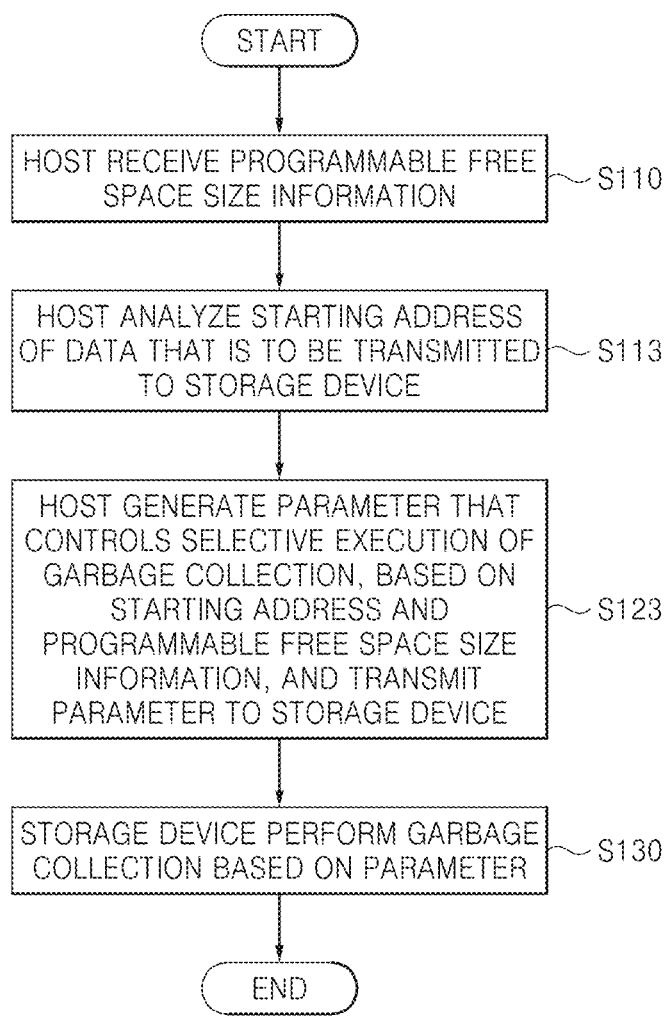
FIG. 7 is a flowchart illustrating operations of the system illustrated in FIG. 1 or 2, according to an embodiment of the inventive concept.
Figure 8:
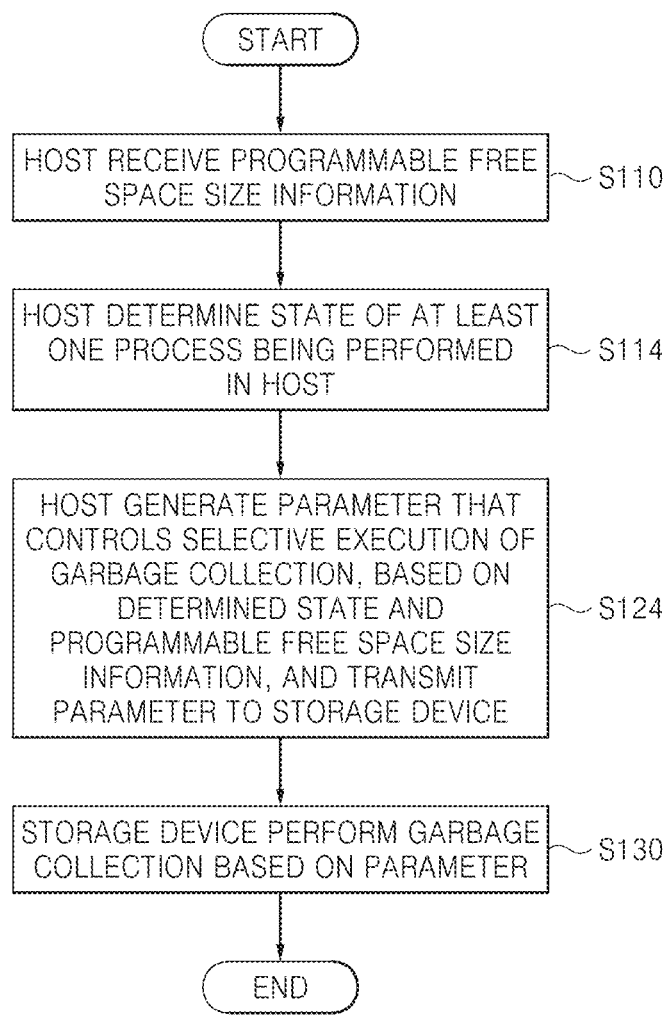
FIG. 8 is a flowchart illustrating operations of the system illustrated in FIG. 1 or 2, according to an embodiment of the inventive concept.

FIG. 3 illustrates a memory map corresponding to memory cell array 311-1.

Referring to FIGS. 1 and 3, memory cell array 311-1 provides a storage space (SS) for storing data. Storage space SS is divided into used storage space (USS), which has already been occupied with specific data, and programmable free space (PFS).

First parameter PARA1 can be used to increase or decrease the size of the PFS. For example, garbage collection control module 313-1 may adjust the size of the PFS of first memory device 310A directly, or it may adjust an execution period during which garbage collection is performed in first memory device 310A. Increasing the execution period for garbage collection tends to increase the size of the PFS of first memory device 310A, and decreasing the execution period tends to decrease the size of the PFS.

Second memory device 320A comprises a memory cell array 321-1 and a garbage collection control module 323-1. Similar to memory cell array 311-1, memory cell array 321-1 provides storage space for data, and the storage space comprises a used storage space, which has already been occupied with specific data, and a programmable free space.

Garbage collection control module 323-1 controls the size of a PFS of second memory device 320A or an execution period of time during which the garbage collection is performed in second memory device 320A, based on second parameter PARA2.

As used herein, the term "module" denotes any set of components capable of implementing a designated functionality. For example, garbage collection control module 323-1 may comprise hardware and/or software capable of implementing the described garbage collection control functions.

Figure 2:
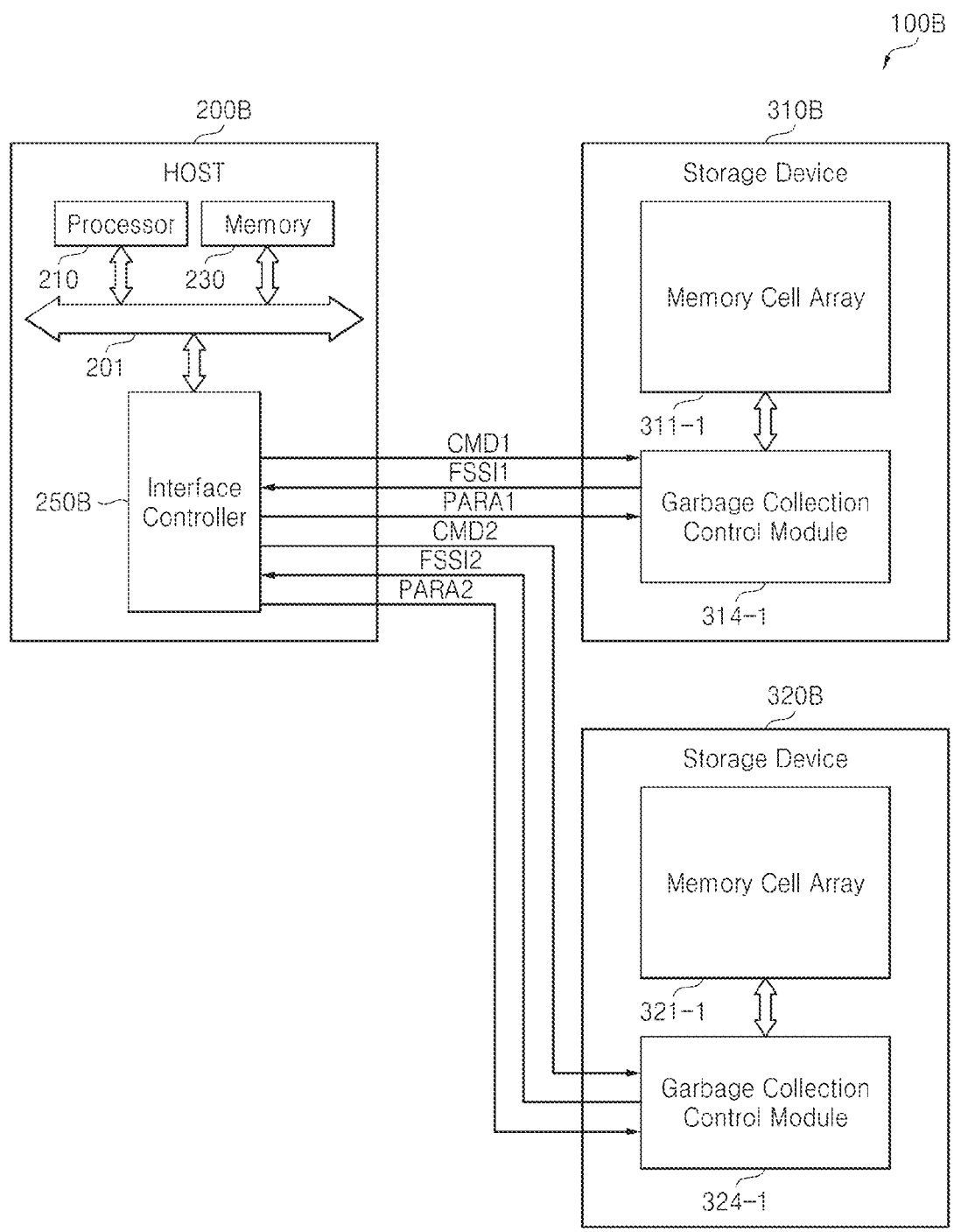
FIG. 2 is a block diagram of a system according to another embodiment of the inventive concept.

FIG. 2 is a block diagram of a system 100B according to another embodiment of the inventive concept.

In contrast to system 100A of FIG. 1, system 100B comprises a host 200B and first and second memory device 310B and 320B. Host 200B comprises an interface controller 250B, which transmits a first request CMD1 to a first memory device 310B of system 100B under the control of a processor 210 included in host 200B. A garbage collection control module 314-1 of first memory device 310B transmits first programmable free space size information FSSI1 to interface controller 250B in response to first request CMD1.

Interface controller 250B also transmits a second request CMD2 to a second memory device 320B of system 100B under the control of processor 210. A garbage collection control module 324-1 of second memory device 320B transmits second programmable free space size information FSSI2 to interface controller 250B in response to second request CMD2. Each of requests CMD1 and CMD2 may be generated during an initialization operation of system 100B or may be generated in real time (or on-the-fly) during a normal operation. Each of requests CMD1 and CMD2 may serve as a command. A memory map of each of the memory devices 320A, 310B, and 320B is similar to the memory map of first memory device 310A illustrated in FIG. 3.

FIGS. 4 through 8 are flowcharts illustrating operations of system 100A of FIG. 1 or system 100B of FIG. 2, according to various embodiments of the inventive concept.

Referring to FIGS. 1 through 4, host 200A or 200B (referred to as a host 200) receives first programmable free space size information FSSI1 from first memory device 310A, in operation S110. As described above with reference to FIG. 2, first memory device 310B may transmit first programmable free space size information FSSI1 to host 200B in response to first request CMD1.

Host 200 generates first parameter PARA1 that controls selective execution of the first garbage collection of first memory device 310A or 310B (referred to as first memory device 310), based on first programmable free space size information FSSI1, and transmits first parameter PARA1 to first memory device 310, in operation S120.

First memory device 310 may increase or decrease the size of the first programmable free space based on first parameter PARA1. First memory device 310 may also increase or decrease an execution period of time during which garbage collection is performed in first memory device 310, based on first parameter PARA1, in operation S130. In other words, first memory device 310 may control garbage collection execution timing based on first parameter PARA1.

Referring to FIGS. 1 through 3, and 5, host 200 receives first programmable free space size information FSSI1 from first memory device 310, in operation S110. As described above with reference to FIG. 2, first memory device 310B may transmit first programmable free space size information FSSI1 to host 200B in response to first request CMD1.

Host 200 analyzes a data pattern of data that is to be transmitted to first memory device 310, in operation S111. Host 200 analyzes, e.g., by operation of processor 210, whether the data to be transmitted to first memory device 310 is sequential data or random data, in operation S111. Sequential data is data having consecutive addresses, and random data is data having non-consecutive addresses. A determination of whether data is sequential or random can be performed by inspecting the data in a host buffer, for instance. A typical example of sequential data is streaming video data.

Host 200 generates first parameter PARA1 that controls selective execution of the first garbage collection of first memory device 310, based on the analyzed data pattern and first programmable free space size information FSSI1, and transmits first parameter PARA1 to first memory device 310, in operation S121. First memory device 310 controls garbage collection execution timing based on first parameter PARA1, in operation S130.

Referring to FIGS. 1 through 3, and 6, host 200 receives first programmable free space size information FSSI1 from first memory device 310, in operation S110. As described above with reference to FIG. 2, first memory device 310B may transmit first programmable free space size information FSSI1 to host 200B in response to first request CMD1.

Host 200 analyzes the amount of the data that is to be transmitted to first memory device 310, in operation S112. As the amount of the data that is to be transmitted increases, a first programmable free space size may need to be increased. Accordingly, host 200 generates first parameter PARA1 that controls selective execution of the first garbage collection of first memory device 310, based on the analyzed amount of the data and first programmable free space size information FSSI1, and transmits first parameter PARA1 to first memory device 310, in operation S122. First memory device 310 controls garbage collection execution timing based on first parameter PARA1, in operation S130.

Referring to FIGS. 1 through 3, and 7, host 200 receives first programmable free space size information FSSI1 from first memory device 310, in operation S110.

As described above with reference to FIG. 2, first memory device 310B may transmit first programmable free space size information FSSI1 to host 200B in response to first request CMD1. Host 200 analyzes the starting address of the data that is to be transmitted to first memory device 310, in operation S113.

Host 200 generates first parameter PARA1 that controls selective execution of the first garbage collection of first memory device 310, based on the starting address of the to-be-transmitted data and first programmable free space size information FSSI1, and transmits first parameter PARA1 to first memory device 310, in operation S123. First memory device 310 controls garbage collection execution timing based on first parameter PARA1, in operation S130.

Referring to FIGS. 1 through 3, and 8, host 200 receives first programmable free space size information FSSI1 from first memory device 310, in operation S110. As described above with reference to FIG. 2, first memory device 310B may transmit first programmable free space size information FSSI1 to host 200B in response to first request CMD1.

Host 200, for example, processor 210, determines whether at least one process (or an application program or processor) being performed in host 200 is in, for example, an active state or an idle state, in operation S114. Where a large number of processes are being performed in host 200, the amount of the data that is to be transmitted to first memory device 310 may increase. Accordingly, host 200 generates first parameter PARA1 that controls selective execution of the first garbage collection of first memory device 310, based on the state of the at least one process being performed in host 200 and first programmable free space size information FSSI1, and transmits first parameter PARA1 to first memory device 310, in operation S124. First memory device 310 controls garbage collection execution timing based on first parameter PARA1, in operation S130.

Operations of second memory device 320A or 320B (referred to as a second memory device 320) and host 200 are substantially the same as or similar to those of first memory device 310 and host 200.

Figure 9:
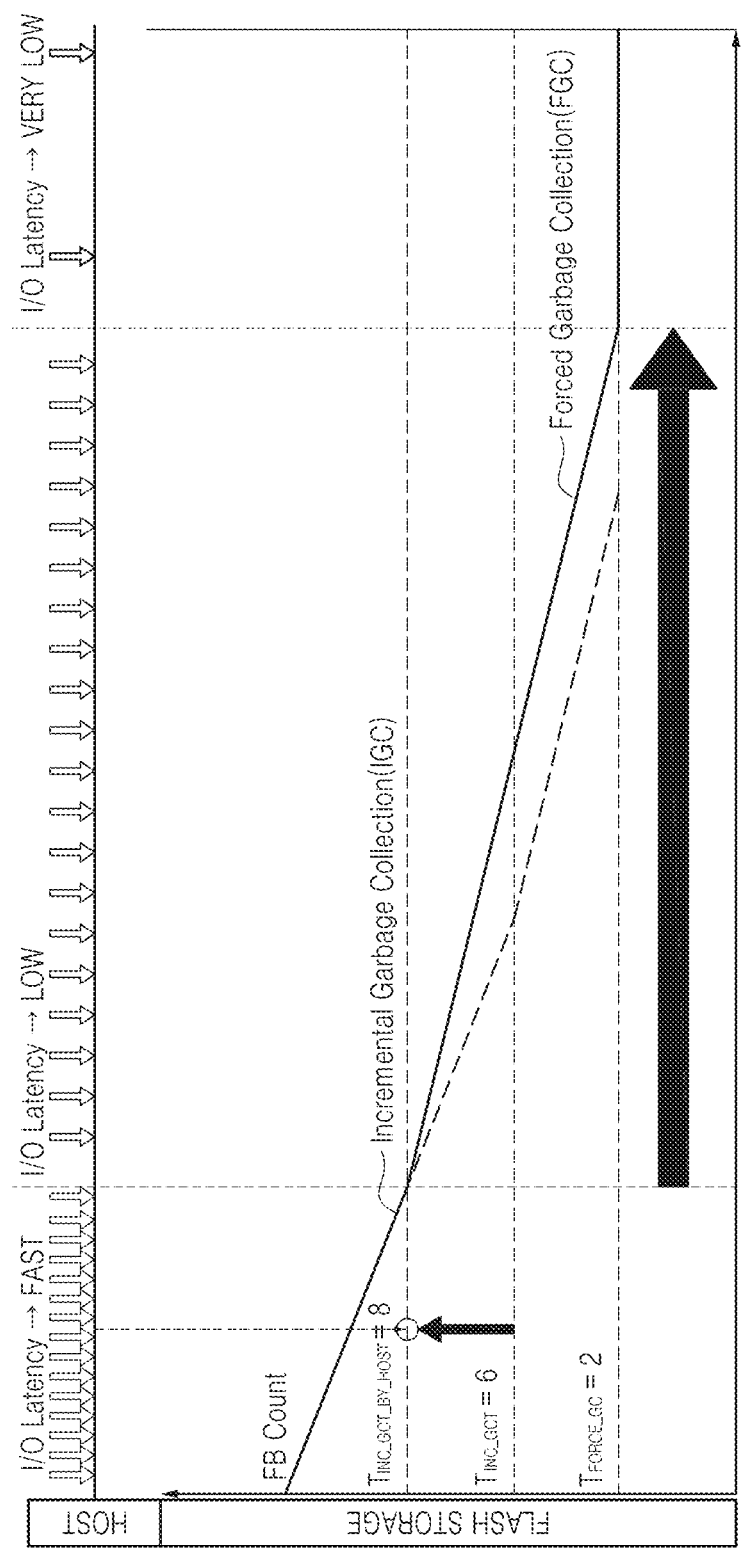
FIG. 9 is a conceptual diagram illustrating a method of changing a garbage collection threshold value to perform host-driven garbage collection according to an embodiment of the inventive concept.

FIG. 9 is a conceptual diagram illustrating a method of changing a garbage collection threshold value to perform host-driven garbage collection according to an embodiment of the inventive concept.

Referring to FIGS. 1 through 9, time is represented by the x-axis and a number of free blocks (FB Count) in a storage device is represented by the y-axis. Additionally, host operations are illustrated at a top portion. The label $T_{FORCE\_GC}$ indicates a threshold value at which forced garbage collection is performed in the storage device (2 blocks), the label $T_{INC\_GCT}$ indicates a threshold value at which incremental garbage collection is performed by default (6 blocks), and the label $T_{INC\_GCT\_BY\_HOST}$ indicates a threshold value at which incremental garbage collection is performed under host-driven garbage collection in response to first parameter PARA1 (8 blocks). Downward facing arrows at the top of the diagram indicate memory access operations of the host. The separation between adjacent arrows indicates the amount of latency for the access operations. Arrows that are closer together correspond to access operations with less latency, and arrows that are farther apart correspond to access operations with more latency. As indicated by the arrow spacing, I/O latency tends to increase as programmable free space decreases.

Forced garbage collection is garbage collection that is performed where first memory device 310 has inadequate free space to store new data without first performing garbage collection. Thus, it takes a lot of time to process the data during forced garbage collection, because the forced garbage collection is performed immediately before processing, for example, programming, data. I/O latency of the data processed during the forced garbage collection is very low.

Incremental garbage collection denotes garbage collection that is performed on first memory device 310 when the programmable free space size is less than or equal to a threshold value. I/O latency of data that is processed during the incremental garbage collection is low.

Where a programmable free space size or a threshold value for the incremental garbage collection increases from "6" to "8", the starting point of time (or execution point of time) of the incremental garbage collection is faster.

A relation between a threshold value for the second memory device 320 and garbage collection is substantially the same as the relation between a threshold value for first memory device 310 and garbage collection.

Figure 10:
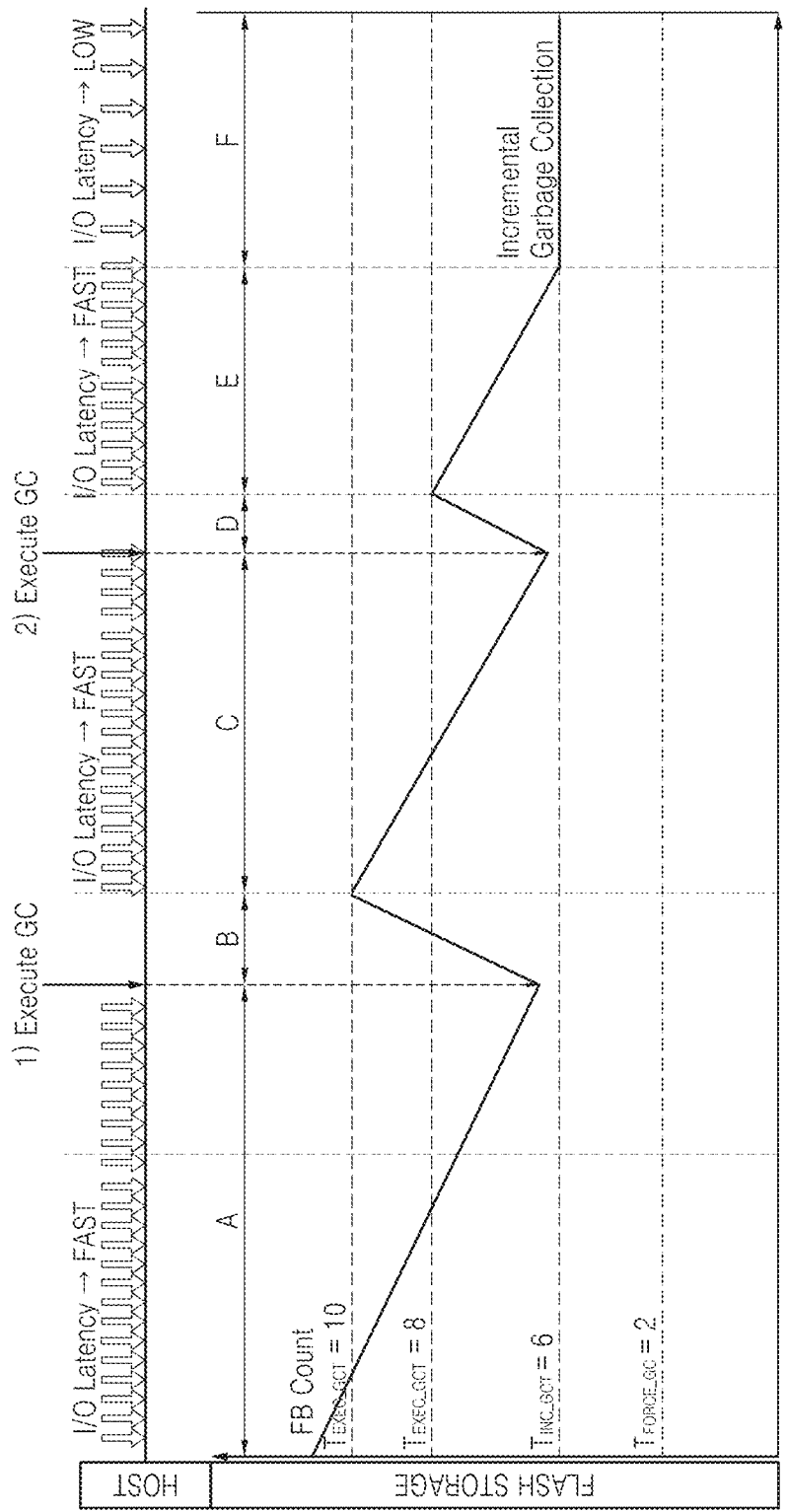
FIG. 10 is a conceptual illustrating another method of changing a garbage collection threshold value to perform host-driven garbage collection according to an embodiment of the inventive concept.

FIG. 10 is a conceptual diagram of another method of changing the garbage collection threshold value in order to achieve host-driven garbage collection according to an embodiment of the inventive concept.

Referring to FIGS. 1 through 10, the labels $T_{INC\_GCT}$ and $T_{FORCE\_GC}$ have the same meaning in FIG. 10 as in FIG. 9. In other words, they represent levels of programmable free space (in blocks) below which the storage device is to initiate incremental garbage collection or forced garbage collection, respectively. The labels $T_{EXEC\_GCT}$, on the other hand, indicate a level of programmable free space above which the storage device is to avoid garbage collection. For instance, during an interval "A", if the host transmits a command to the storage device to initiate garbage collection (an "Execute GC" command), the storage device will ignore such a command where the level of programmable free space is above 10 memory blocks and a threshold value $T_{EXEC\_GCT}$=10 blocks.

In FIG. 10, garbage collection operations are performed in response to Execute GC commands transmitted from the host to the storage device, and they are also performed automatically when the level of programmable free space falls to the threshold values $T_{INC\_GCT}$ and $T_{FORCE\_GC}$. During the interval "A", the level of programmable free space decreases as program operations are performed. Then, the host transmits an Execute GC command to the storage device, and the storage device responds by performing garbage collection during an interval "B". During interval "B", the storage device transmits a busy signal to the host, and no further memory access operations are allowed. The performance of garbage collection frees up memory blocks, so it increases the level of programmable free space as shown by the diagram in FIG. 10.

Once the level of programmable free space reaches the threshold value $T_{EXEC\_GCT}$=10 blocks, garbage collection ends and memory access operations resume during an interval "C". Thereafter, another Execute GC command causes the host to perform garbage collection operations in an interval "D". These garbage collection operations end when the level of programmable free space reaches a threshold level $T_{EXEC\_GCT}$=8 blocks, which has been lowered since the interval "B". In other words, the threshold level for ending garbage collection operations may be adjusted over time. Such adjustments are typically performed through the transmission of a parameter (e.g., PARA1 or PARA2) to the storage device.

Next, in an interval "E", further memory access operations are performed until the level of programmable free space reaches the threshold level $T_{INT\_GCT}$ at which incremental garbage collection is performed. At this point, incremental garbage collection is performed in an interval "F", which prevents the level of programmable free space from decreasing and increases I/O latency of the storage device.

Figure 11:
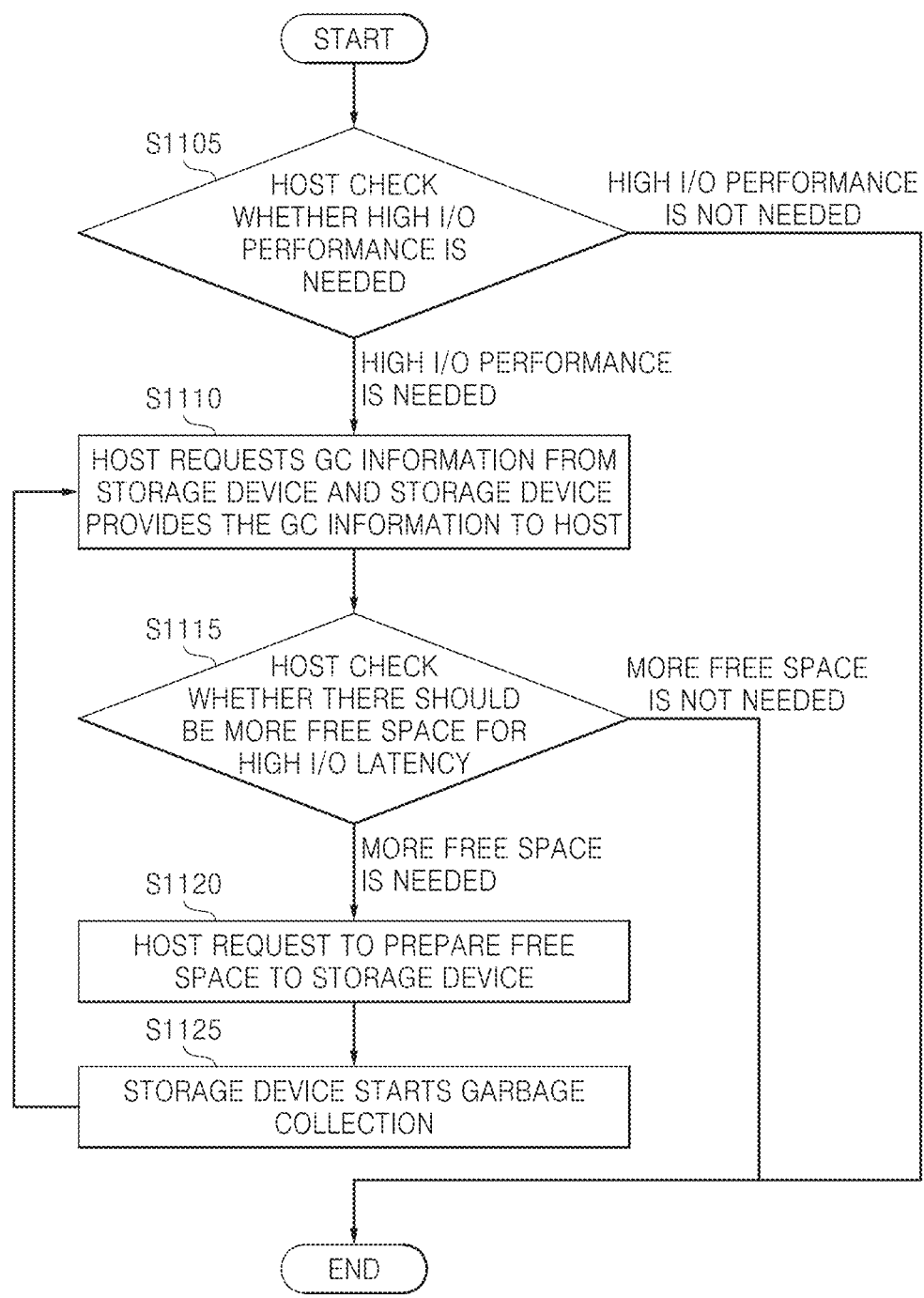
FIG. 11 is a flowchart illustrating a method of performing host-driven garbage collection on a storage device according to an embodiment of the inventive concept.

FIG. 11 is a flowchart illustrating a method of performing host-driven garbage collection on a storage device according to an embodiment of the inventive concept. In the method of FIG. 11, a system comprising a host and storage device may operated with relatively high I/O performance on an as needed basis.

Referring to FIG. 11, the method begins with a host checking whether high I/O performance is needed, in operation S1105. If not, the method terminates. Otherwise, the method proceeds to an operation S1110, in which the host requests GC information from the storage device, and the storage device provides the GC information to the host.

Next, the host determines whether the storage device needs to have more programmable free space to achieve high I/O latency, in an operation S1115. If more programmable free space is not needed, the method terminates. Otherwise, the method proceeds to operation S1120, in which the host sends a request to the storage device to prepare more programmable free space. In response to this request, the storage device performs garbage collection, in an operation S1125. Thereafter, the method returns to operation S1110.

Figure 12:
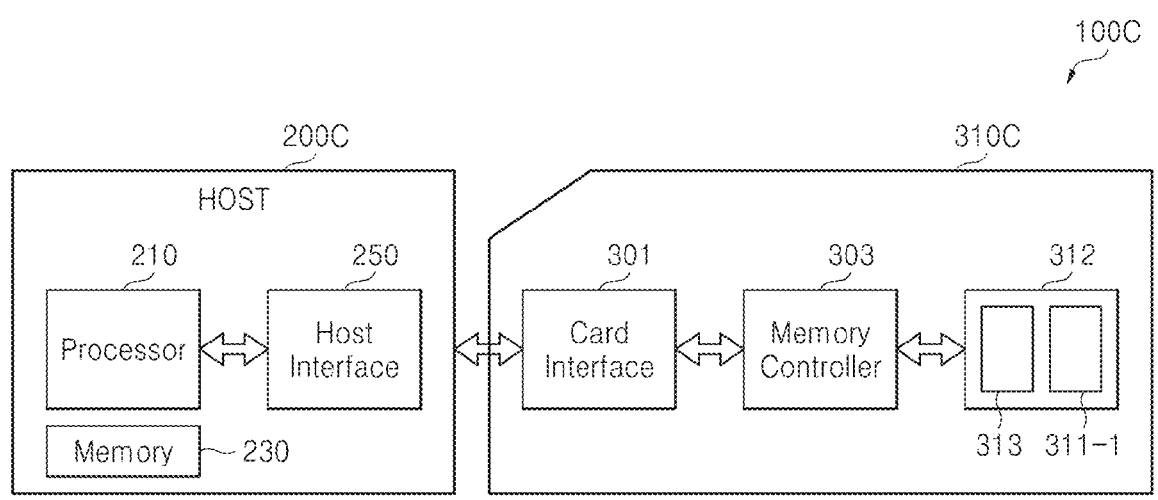
FIG. 12 is a block diagram of a system according to another embodiment of the inventive concept.

FIG. 12 is a block diagram of a system 100C according to still another embodiment of the inventive concept.

Referring to FIG. 12, system 100C comprises a host 200C and a memory card 310C. Host 200C comprises a processor 210, a memory 230, and a host interface 250. Host 200C may be a PC, a data server, a NAS, or a portable electronic device, for instance. Memory card 310C may be an eMMC or secure digital (SD) card, for instance.

Host interface 250 may be implemented by using interface controller 250A of FIG. 1 or interface controller 250B of FIG. 2.

Memory card 310C comprises a card interface 301, a memory device 312, and a memory controller 303. Card interface 301 communicates with host interface 250, and the memory controller 303 controls data communication between card interface 301 and memory device 312.

Memory device 312 comprises a memory cell array 311-1 and a garbage collection control module 313-1. Garbage collection control module 313-1 may be implemented using garbage collection control module 313-1 of FIG. 1 or the garbage collection control module 314-1 of FIG. 2. Memory device 312 is typically a flash-based storage device.

Figure 13:
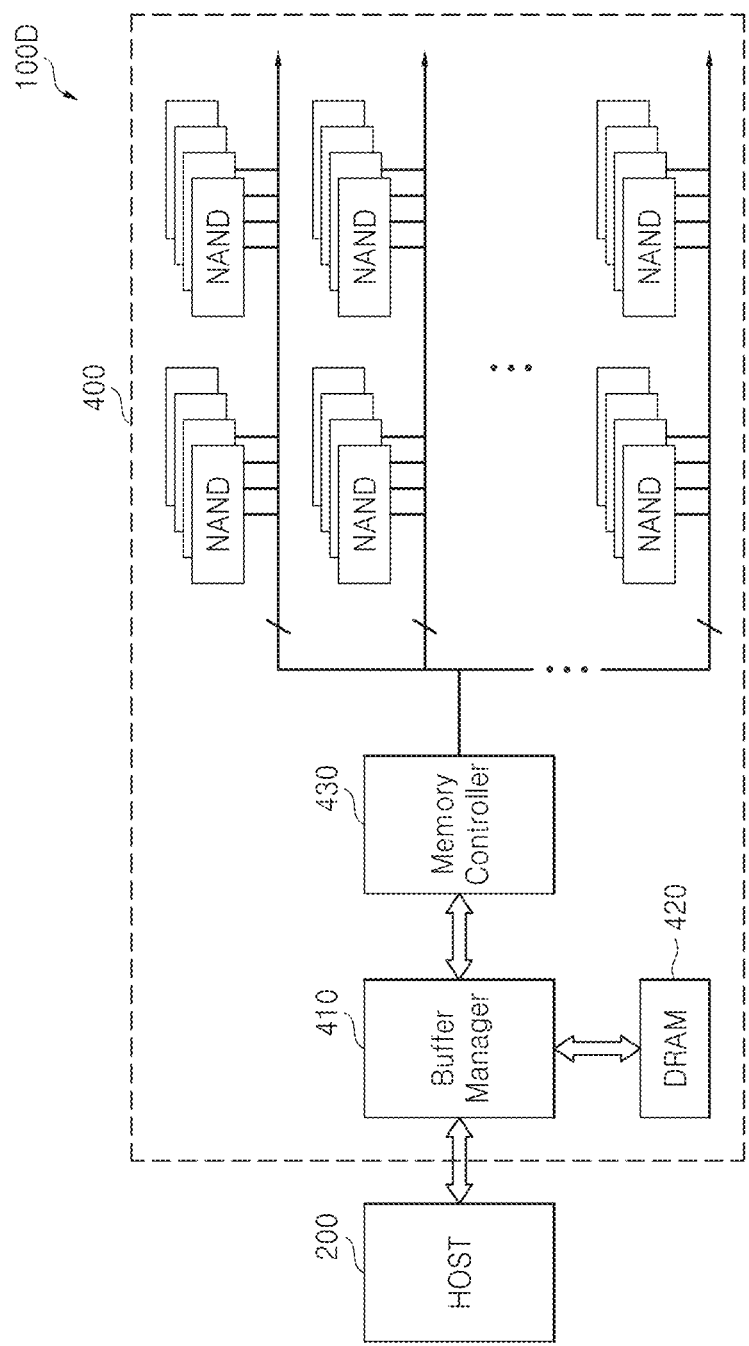
FIG. 13 is a block diagram of a system according to another embodiment of the inventive concept.

FIG. 13 is a block diagram of a system 100D according to another embodiment of the inventive concept.

Referring to FIG. 13, system 100D comprises host 200, a buffer manager 410, a dynamic random access memory (DRAM) 420, a memory controller 430, and a plurality of flash-based storage devices, for example, NAND flash memory devices. System 100D may be a system comprising an SSD 400, and SSD 400 comprises buffer manager 410, DRAM 420, memory controller 430, and the NAND flash memory devices.

Memory controller 430 may control a data processing operation of each of the NAND flash memory devices, for example, a program operation, a read operation, or an erase operation. Buffer manager 410 may control data exchanged between host 200 and memory controller 430 to be stored in the DRAM 420.

Figure 14:
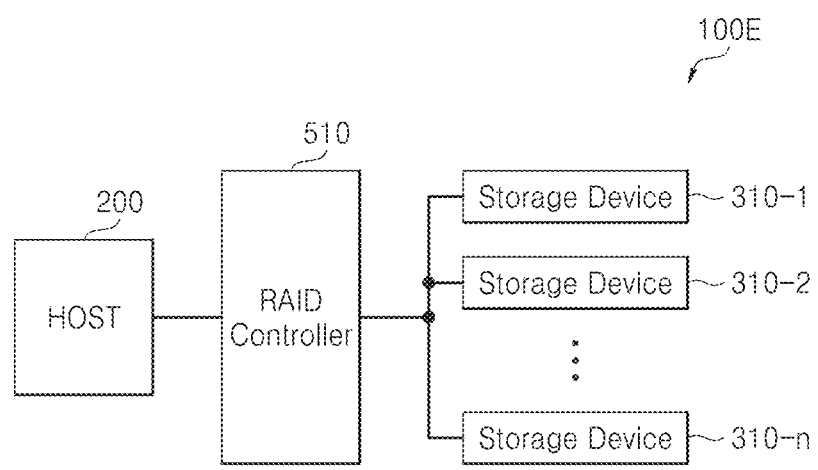
FIG. 14 is a block diagram of a system configured to perform host-driven garbage collection according to an embodiment of the inventive concept.

FIG. 14 is block diagram of a system 100E capable of performing the host-driven garbage collection according to an embodiment of the inventive concept. System 100E may be implemented by using a RAID. System 100E comprises host 200, a RAID controller 510, and a plurality of memory devices 310-1 through 310-n (where n is a natural number). According to another embodiment, host 200 comprises RAID controller 510.

Each of the memory devices 310-1 through 310-n may be memory device 310A illustrated in FIG. 1 or memory device 310B illustrated in FIG. 2. Memory devices 310-1 through 310-n may constitute an RAID.

During a program operation, the RAID controller 510 may output program data output by host 200 to at least one of the memory devices 310-1 through 310-n, based on the level of the RAID.

During a read operation, the RAID controller 510 may transmit to host 200 data that is output by at least one of the memory devices 310-1 through 310-n, based on the RAID level. Each of the systems 100A through 100E may be a computing system.

Figure 15:
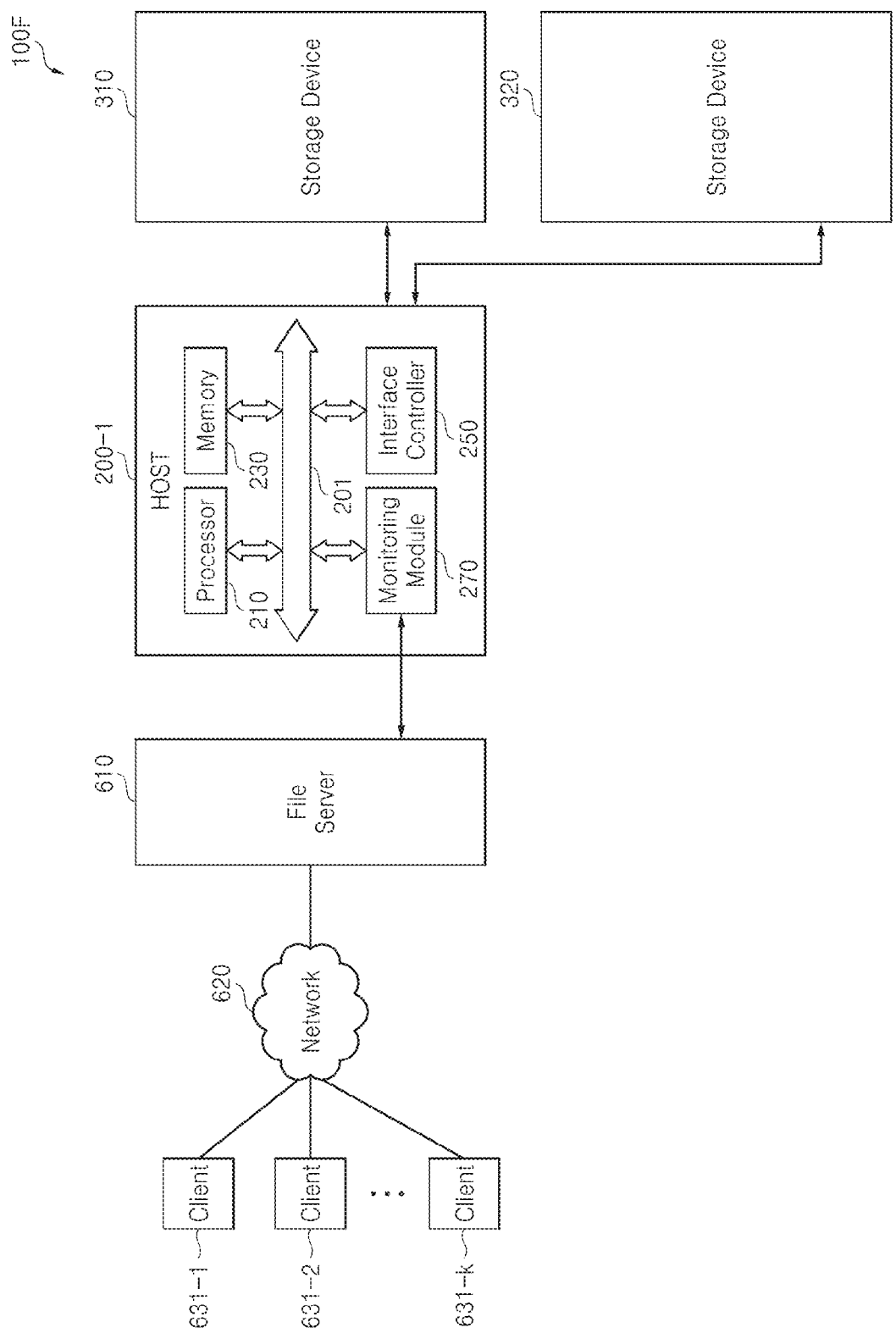
FIG. 15 illustrates a computer network according to an embodiment of the inventive concept.

FIG. 15 illustrates a computer network according to an embodiment of the inventive concept.

Referring to FIGS. 1 through 15, a computing system, data communication network, or computer network 100F comprises a host 200-1, at least one memory device 310 and 320, a file server 610, and a plurality of clients (or client computers) 631-1 through 631-k (where k is a natural number). Except for a monitoring module 270, a function and a structure of host 200-1 are substantially the same as those of host 200A of FIG. 1 or host 200B of FIG. 2.

A structure and a function of first memory device 310 are substantially the same as those of first memory device 310A of FIG. 1 or first memory device 310B of FIG. 2. A structure and a function of the second memory device 320 are substantially the same as those of second memory device 320A of FIG. 1 or second memory device 320B of FIG. 2.

File server 610 and the clients 631-1 through 631-k may perform data communication via a wired or wireless network 620. The wired or wireless network 620 may be an internet, a near field communication (NFC) network, or a mobile communication network. File server 610 serves as a data server or a data center. File server 610 may serve as a data source that provides data to host 200-1.

Figure 16:
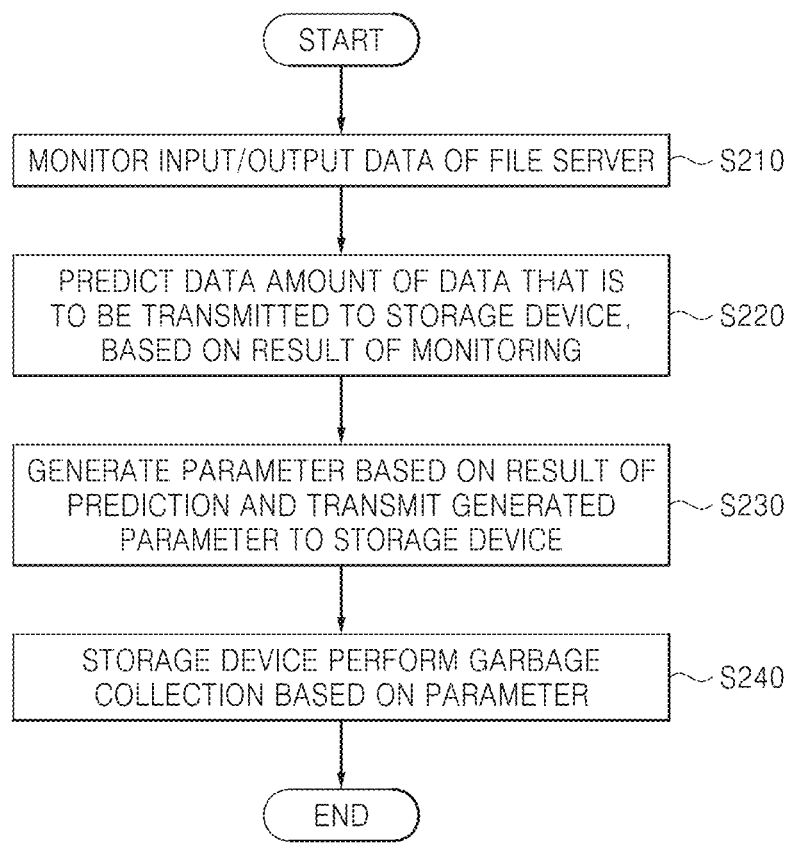
FIG. 16 is a flowchart illustrating a method in which a host in the computer network of FIG. 15 generates a parameter to control selective execution of garbage collection of a memory device, according to an embodiment of the inventive concept.

FIG. 16 is a flowchart illustrating a method in which host 200-1 of computer network 100F of FIG. 15 generates a parameter to control selective execution of garbage collection of a memory device, according to an embodiment of the inventive concept.

Referring to FIGS. 1 through 16, monitoring module 270 of the host 201-1 monitors a data amount, data traffic, or internet data traffic that is exchanged between file server 610 and each of the clients 631-1 through 631-k, in operation S210. Monitoring module 270 of host 201-1 may also monitor a workload or QoS, in operation S210.

Where monitoring module 270 transmits a result of the monitoring to processor 210, processor 210 may predict a data amount or data pattern of the data that is to be transmitted to the memory device(s) 310 and/or 320 based on a result of the monitoring, in operation S220.

Processor 210 generates first and/or second parameter PARA1 and/or PARA2 based on a result of the prediction, and it transmits first and/or second parameter PARA1 and/or PARA2 to first and/or second memory device 310 and/or 320, in operation S230.

As described above with reference to FIGS. 1 through 16, host 200-1 may generate first and/or second parameter PARA1 and/or PARA2 based on a result of the prediction and/or the first and second programmable free space size information FSSI1 and/or FSSI2.

Host 200-1 analyzes at least one of the result of the prediction, the data pattern, the data amount, and the starting address of the data that is to be transmitted to the first and second memory devices 310 and/or 320, and it generates first and/or second parameter PARA1 and/or PARA2 based on a result of the analysis and first and second programmable free space size information FSSI1 and/or FSSI2.

Thus, first and/or second memory device 310 and/or 320 may perform garbage collection based on first and/or second parameter PARA1 and/or PARA2, in operation S240. In other words, first and/or second memory device 310 and/or 320 may control garbage collection execution timing based on first and/or second parameter PARA1 and/or PARA2.

The foregoing is illustrative of embodiments and is not to be construed as limiting thereof. Although a few embodiments have been described, those skilled in the art will readily appreciate that many modifications are possible in the embodiments without departing from the scope of the inventive concept.

What is claimed is:

1. A method executed by a host, the method comprising:
receiving information related to garbage collection of a storage device from the storage device; and
controlling selective execution of the garbage collection by the storage device according to the received information,
wherein the controlling of selective execution of garbage collection comprises transmitting, to the storage device, a garbage collection command and at least one parameter value determining an amount of the garbage collection to be performed by the storage device in response to the garbage collection command,
wherein the controlling of selective execution of garbage collection comprises,
analyzing information regarding data to be stored in the storage device, the information regarding the data to be stored in the storage device comprising at least an amount and a starting address of the data to be stored in the storage device, and
controlling an amount of the garbage collection to be performed by the storage device according to the analyzed information.

2. The method of claim 1, wherein the received information indicates at least one of an amount of programmable free space in the storage device, a garbage collection state of the storage device, a garbage collection threshold of the storage device, and an allotted time for the garbage collection of the storage device.

3. The method of claim 1, wherein the at least one parameter value indicates at least one of an execution period for the garbage collection, a quantity of memory to be freed by the garbage collection, and an overall level of programmable free space to be achieved in the storage device by the garbage collection.

4. The method of claim 1, wherein the controlling of selective execution of garbage collection comprises:
transmitting, to the storage device, a threshold value indicating a modified level of programmable free space below which the storage device is to initiate incremental garbage collection.

5. The method of claim 1, wherein the controlling of selective execution of garbage collection comprises:
transmitting, to the storage device, a threshold value indicating a level of programmable free space above which the storage device is to avoid the garbage collection.

6. The method of claim 1, further comprising:
transmitting a command requesting the information regarding the garbage collection, wherein the storage device transmits the information to the host in response to the command.

7. The method of claim 1, wherein
the information regarding data to be stored in the storage device further comprising a pattern of the data to be stored in the storage device.

8. The method of claim 7, wherein the analyzing comprises determining whether the data to be stored in the storage device has a sequential pattern or a random pattern, and controlling the amount of the garbage collection to be performed comprises increasing the amount of the garbage collection to be performed upon determining that the data to be stored in the storage device has the random pattern.

9. The method of claim 1, wherein the controlling of selective execution of garbage collection comprises:
analyzing information regarding a process performed by the host; and
adjusting an amount of the garbage collection to be performed by the storage device according to the analyzed information.

10. The method of claim 9, wherein the information regarding the process performed by the host indicates whether the process is in an idle state or an active state.

11. A method executed by a storage device, the method comprising:
transmitting, to a host, information related to garbage collection of the storage device from the storage device;
receiving, from the host, an instruction generated in response to the information related to the garbage collection; and
selectively executing the garbage collection according to the received instruction,
wherein the instruction comprises a garbage collection command and at least one parameter value determining an amount of the garbage collection to be performed by the storage device in response to the garbage collection command,
wherein the selectively executing the garbage collection comprises,
analyzing information regarding data regarding data to be stored in the storage device, the information regarding the data to be stored in the storage device comprising at least an amount and a starting address of the data to be stored in the storage device, and
controlling an amount of the garbage collection to be performed by the storage device according to the analyzed information.

12. The method of claim 11, wherein the information related to the garbage collection of the storage device indicates at least one of an amount of programmable free space in the storage device, a garbage collection state of the storage device, a garbage collection threshold of the storage device, and an allotted time for the garbage collection of the storage device.

13. The method of claim 11, wherein the at least one parameter value indicates at least one of an execution period for the garbage collection, a quantity of memory to be freed by the garbage collection, and an overall level of programmable free space to be achieved in the storage device by the garbage collection.

14. The method of claim 11, wherein the selective execution of the garbage collection comprises:
determining whether a level of programmable free space in the storage device is below a threshold value received from the host; and
initiating incremental garbage collection as a consequence of determining that the level of programmable free space in the storage device is below the threshold value.

15. The method of claim 11, wherein the selective execution of the garbage collection comprises:
receiving a command from the host;
determining whether a level of programmable free space in the storage device is greater than a threshold value received from the host; and
executing the garbage collection in response to the command only where the level of programmable free space in the storage device is determined not to be greater than the threshold value.

16. The method of claim 11, further comprising:
receiving a command requesting the information regarding the garbage collection, and transmitting the information to the host in response to the command.

17. A method, comprising:
transmitting, by a storage device to a host, information related to garbage collection of the storage device;
transmitting, by the host to the storage device, an instruction generated in response to the information related to the garbage collection; and
selectively executing the garbage collection, by the storage device, according to the instruction,
wherein the instruction comprises a garbage collection command and at least one parameter value determining an amount of the garbage collection to be performed by the storage device in response to the garbage collection command,
wherein the selectively executing the garbage collection comprises,
analyzing information regarding data to be stored in the storage device, the information regarding the data to be stored in the storage device comprising at least an amount and a starting address of the data to be stored in the storage device, and
controlling an amount of the garbage collection to be performed by the storage device according to the analyzed information.

18. The method of claim 17, wherein the information related to the garbage collection of the storage device indicates an amount of programmable free space in the storage device.

19. The method of claim 17, wherein the information related to the garbage collection of the storage device indicates whether the garbage collection is needed in the storage device, or whether the garbage collection is being performed by the storage device.

20. The method of claim 17, wherein the information related to the garbage collection of the storage device indicates a garbage collection threshold of the storage device.

21. The method of claim 17, wherein the information related to the garbage collection of the storage device indicates an allotted time for the garbage collection of the storage device.

22. The method of claim 17, wherein the at least one parameter value indicates an execution period for the garbage collection to be performed in response to the garbage collection command.

23. The method of claim 17, wherein the at least one parameter value indicates a quantity of memory to be freed by the garbage collection performed in response to the garbage collection command.

24. The method of claim 17, wherein the at least one parameter value indicates an overall level of programmable free space to be achieved in the storage device by the garbage collection performed in response to the garbage collection command.

* * * * *